Figure 1:
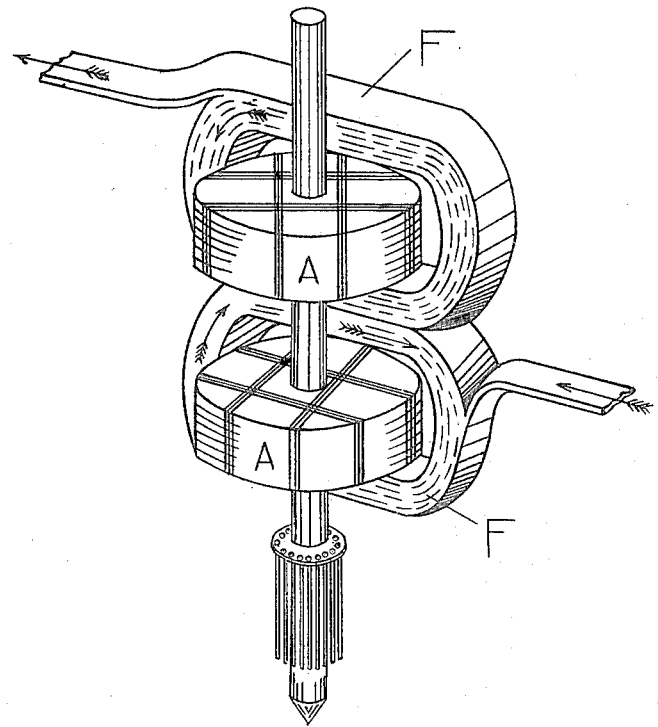

No. 660,057. Patented Oct. 16, 1900.
S. EVERSHED.
ASTATIC ARMATURE FOR ELECTRIC SUPPLY METERS.
(Application filed July 21, 1900.)

(No Model.) 2 Sheets—Sheet 1.

WITNESSES:

INVENTOR
Sydney Evershed
BY
ATTORNEYS

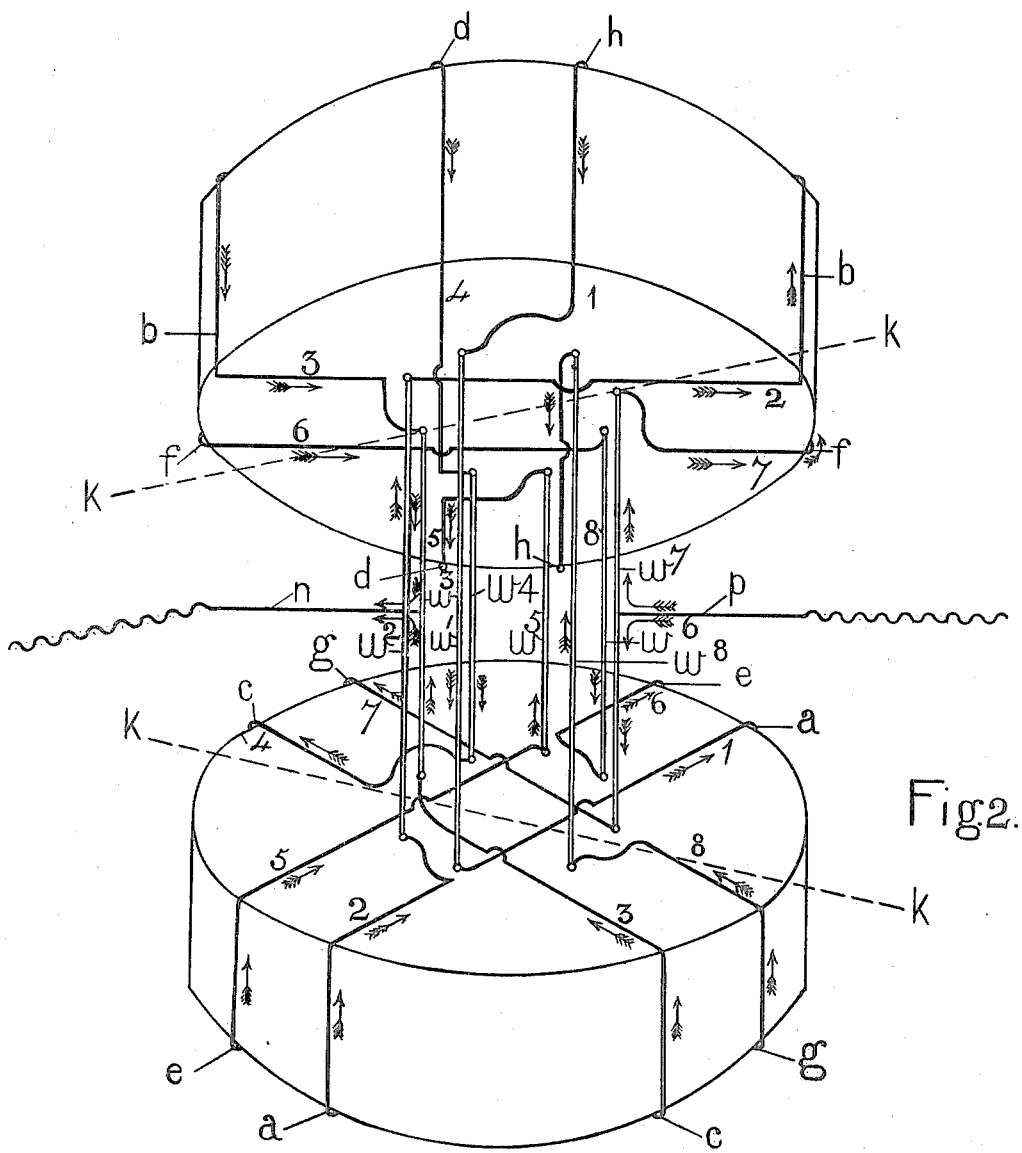

UNITED STATES PATENT OFFICE.

SYDNEY EVERSHED, OF LONDON, ENGLAND, ASSIGNOR TO HIMSELF AND THE EVERSHED & VIGNOLES, LIMITED, OF SAME PLACE.

ASTATIC ARMATURE FOR ELECTRIC-SUPPLY METERS.

SPECIFICATION forming part of Letters Patent No. 660,057, dated October 16, 1900.

Application filed July 21, 1900. Serial No. 24,420. (No model.)

*To all whom it may concern:*

Be it known that I, SYDNEY EVERSHED, a subject of the Queen of Great Britain and Ireland, residing at London, England, have invented a new and useful Improved Astatic Armature for Electric-Supply Meters, (for which I have made application for Letters Patent in Great Britain, No. 3,534, dated February 22, 1900, and in Germany, dated May 10, 1900,) of which the following is a specification.

This invention relates to the protection of the rotative axle of sensitive motors, such as a motor-meter for small currents, from the disturbing effects of stray magnetic fields; and it consists in a specific form of winding of a divided armature without increase or duplication of the coils or amount of wire required as compared with a single armature, by which the motor-armature is rendered astatic—*i. e.*, operated by two magnetic fields of opposite polarity—so that any stray magnetic field will tend to drive one part of the divided astatic armature in one direction and the other part in the opposite direction, thus having little or no effect upon the speed of rotation of such an astatic armature.

Motor-meters having a rotary armature are liable to have their speed raised or lowered by the presence of stray magnetic fields. It is well known that this defect can be obviated by the provision of two complete armatures mounted on the main axle and so connected, whether with one commutator or two, as to require magnetic fields in opposite directions to drive them in the same sense; but according to my invention this complete duplication of parts may be dispensed with and an astatic armature may be made containing the same number of coils as an ordinary nonastatic armature.

In making my astatic armature I provide two "formers," bodies, or cores fixed at a little distance apart upon the axle. Thus if the axle is vertical the two spiders will be one above the other. I employ an ordinary drum-winding so far as its electrical functions are concerned; but in order that the winding may be astatic it is carried out in the following manner:

Figure 1 is a perspective view of a complete armature and fields, and Fig. 2 is a perspective diagrammatic view of the winding.

An eight-coil winding is shown; but it is to be understood that any convenient number of coils may be used, so long as it is an even number, permitting of the same number of coils being placed upon each of the two halves into which the armature is divided. A A is the divided astatic armature, and F F the magnet-fields wound in opposite directions. The eight coils are lettered, respectively, $a$, $b$, $c$, $d$, $e$, $f$, $g$, and $h$, the coils $a\ c\ e\ g$ being wound upon the lower body or core, while $b$, $d$, $f$, and $h$ are wound on the upper body or core. Following the ordinary course of a drum-winding the coils are connected in the order of lettering, and if the ends of coil $a$ are numbered 1 and 2, the ends of coil $b$ numbered 2 and 3, the ends of coil $c$ numbered 3 and 4, and so on up to coil $g$, which would have its ends 7 and 8, coil $h$ having its ends numbered 8 and 1, as shown in the diagram, then the necessary connections between the coils on the upper body or core and those on the lower body will be made by means of eight vertical wires at $W'$, $W^2$, $W^3$, &c., up to $W^8$, coil ends of like number on the upper and lower bodies or cores being connected together through the medium of the corresponding vertical wire. Thus, for example, the end of the coil $f$, which is marked 7, is connected to the upper end of the wire $W^7$, and this wire is at its lower end connected to the end of coil $g$, which is also marked 7. The vertical connecting-wires being arranged symmetrically in a cylindrical plane whose axis is in the axis of rotation of the armature would serve as commutator-segments, as their positions relatively to that of the coils place them in the right positions for the purpose. For example, if the dotted lines marked $k\ k$ indicate the plane of commutation—that is to say, the plane at right angles to the direction of the magnetic fields— the commutator-brushes $p\ n$ would be so placed as to make contact with the vertical wires $W^7$ and $W^3$. Now if the current enters by the brush $p$ it will follow the two paths of the drum, winding in the directions indicated by arrows. It will be seen that the currents in the coils travel in precisely the same manner and in the same order from coil to coil as they do in an ordinary drum-winding such as is commonly employed in dynamos; but in all those coils which are upon the upper body or core the currents are traveling, in a sense, opposed to that of the currents in the coils on the lower body. Hence in order that the upper and lower halves of the armature may be caused to rotate in the same direction it is necessary that the magnetic fields which drive them should be in opposite directions. In other words, the arrangement is astatic in the sense that a uniform magnetic field applied alike and in the same direction to the two half-armatures produces no turning moment.

I have described the astatic armature as though the vertical connecting-wires W were themselves the commutator-segments; but it is obvious that a commutator of any suitable kind may be placed in any convenient position upon the armature-axle, and its segments may be electrically connected in proper order to the aforesaid vertical wires, an arrangement which I prefer to adopt in practice; but in the diagram I confine myself to showing the essential features of my astatic armatures.

Having now described this invention, what I claim, and desire to secure by Letters Patent, is—

In an electric-supply meter of the motor type, an astatic armature, consisting of coils coupled in succession in the usual order and in the usual relative angular positions as regards azimuth, but having alternate coils wound upon the upper and lower of two "formers" upon the motor-axle, the coils on the upper former being so connected as to cause the current in them to flow in the opposite sense to that flowing in the lower coils, substantially as described.

In witness whereof I have hereunto set my hand in presence of two witnesses.

SYDNEY EVERSHED.

Witnesses:
 RICHARD A. HOFFMANN,
 CHARLES CARTER.